United States Patent [19]

Wagner et al.

[11] Patent Number: 4,832,661
[45] Date of Patent: May 23, 1989

[54] APPARATUS AND METHOD FOR MAINTAINING ALTERNATOR OUTPUT ABOVE PREDETERMINED LEVELS

[75] Inventors: Wayne M. Wagner, Apple Valley; Douglas E. Flemming, Rosemount, both of Minn.

[73] Assignee: Donaldson Company, Inc., Minneapolis, Minn.

[21] Appl. No.: 266,298

[22] Filed: Oct. 31, 1988

Related U.S. Application Data

[63] Continuation of Ser. No. 190,590, May 5, 1988, abandoned.

[51] Int. Cl.$^4$ ............................................. F16H 9/00
[52] U.S. Cl. ....................................... 474/69; 474/70; 474/113
[58] Field of Search ................... 474/69, 70, 84, 85, 474/88, 89, 101, 109, 113, 114, 11, 12; 74/856–862, 873, 875–876; 60/286

[56] References Cited

U.S. PATENT DOCUMENTS

| 2,927,571 | 3/1960 | Kamlukin | 474/114 X |
| 3,318,116 | 5/1967 | Houser et al. | 474/70 X |
| 4,400,930 | 8/1983 | Huhman et al. | 474/70 X |
| 4,538,411 | 9/1985 | Wade et al. | 60/286 X |
| 4,562,695 | 6/1986 | Rao et al. | 60/286 |
| 4,610,138 | 9/1986 | Shinzawa | 60/286 |

FOREIGN PATENT DOCUMENTS

83/02043 12/1983 PCT Int'l Appl. .
1378901 12/1974 United Kingdom ................. 474/70

Primary Examiner—Thuy M. Bui
Attorney, Agent, or Firm—Merchant, Gould, Smith, Edell, Welter & Schmidt

[57] ABSTRACT

A mechanism which maintains a required power level for an electrical use device even though the power level would otherwise drop below that which is necessary at engine idle or alternator speed would increase beyond an acceptable maximum at engine hi idle. The apparatus includes a variator pulley along with mechanism for moving the pulley between first and second positions thereby increasing or decreasing the ratio of alternator speed to engine speed.

5 Claims, 2 Drawing Sheets

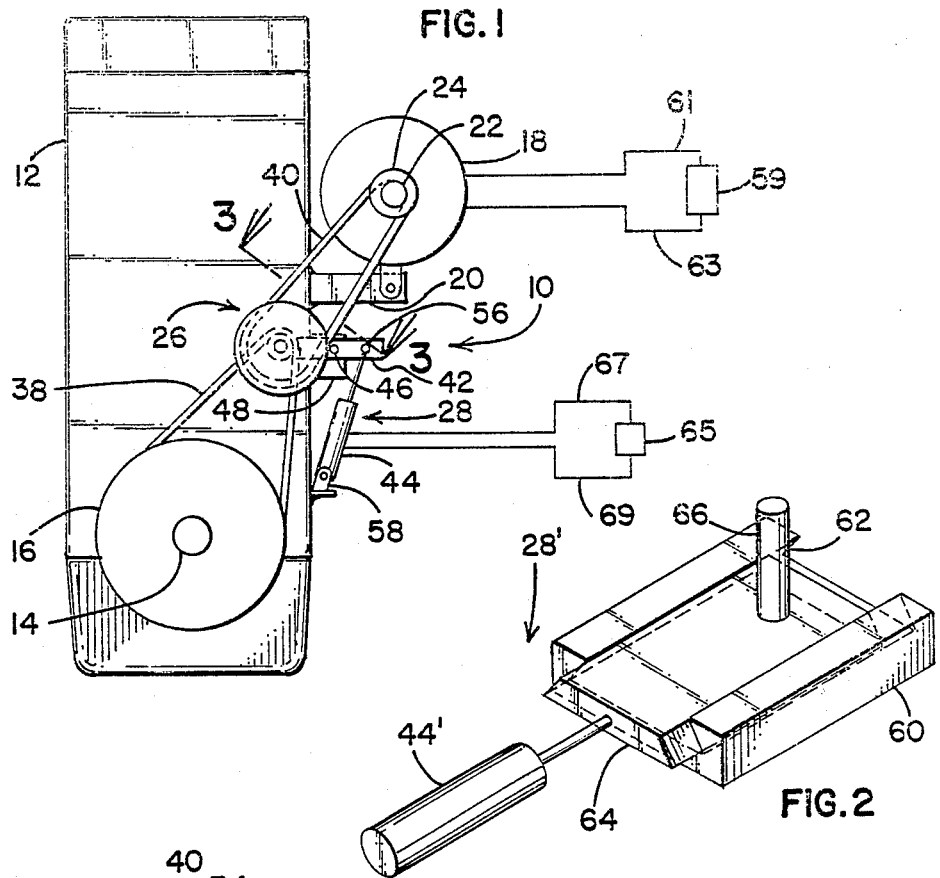
FIG. 1
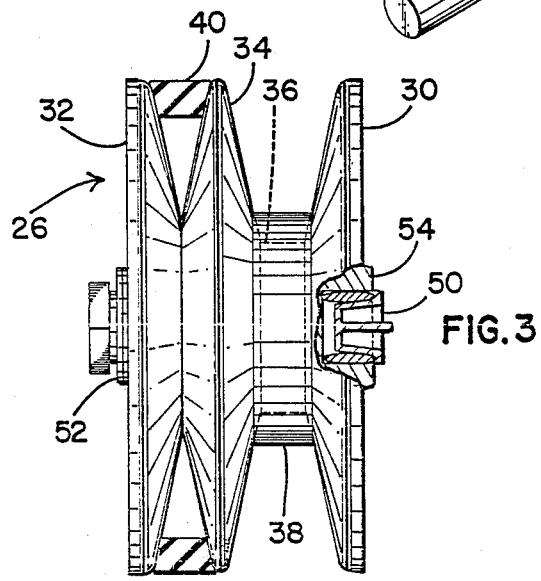
FIG. 2
FIG. 3

APPARATUS AND METHOD FOR MAINTAINING ALTERNATOR OUTPUT ABOVE PREDETERMINED LEVELS

This is a continuation of application Ser. No. 190,590, filed May 5, 1988 now abandoned.

FIELD OF THE INVENTION

The invention is directed to the general field of automotive power sources and, more particularly, to drive mechanism for an alternator.

BACKGROUND OF THE INVENTION

The use of alternators to convert rotary motion to electrical power is well known. In the automotive industry, alternators are driven by the rotary motion of the crankshaft of a diesel or gasoline engine. The electrical energy output increases as the rotary speed increases. Since the alternator is ordinarily wired in parallel with a battery, the battery provides a minimal power level for driving the starting motor and for powering other electrical accessories when the engine is off or at idle. As the vehicle is driven, engine speed is increased, and the alternator not only becomes the primary electrical power source but also recharges the battery. It is conventional then that during times when the engine is off or at low idle, the battery is sufficient to power all needed accessories. When engine speed increases, the alternator is sufficient to power accessories and recharge the battery during the entire speed range.

In recent years, the automotive industry has been challenged to substantially decrease certain kinds of emissions from the exhaust of engines. Catalytic converters have been used extensively. In a prior application by the same inventor and assigned to the same assignee, a mechanism for radiantly heating a ceramic filter and burning particulates filtered from the exhaust of a diesel engine is disclosed. The heating elements require a minimal power level so as to heat sufficiently to cause ignition of particulates at times when the filter is sufficiently loaded and in need of regeneration. The required power level is greater than the output of conventional alternators when a conventional diesel engine is at low idle. There is no known mechanism for enhancing the output of an alternator under these conditions so that emission standards may be maintained during all engine-on times. The present invention provides a solution to this problem.

SUMMARY OF THE INVENTION

The present invention is directed to apparatus for powering an electrical load at or greater than a predetermined power level. The apparatus includes an engine having a continuous speed range including an upper speed portion and a lower speed portion. The engine also has an output drive member. The apparatus further includes an alternator which increases electrical energy output as rotary speed increases to a maximum speed. Electrical energy output is less than the predetermined power level for the lower portion of speed range of the engine and is greater than the predetermined power level of the upper portion of speed range of the engine. Furthermore, the apparatus also includes a mechanism for electrically connecting the alternator to the load and a mechanism for driving the alternator with the output drive member of the engine. The driving mechanism includes first and second positions. The first position provides a first ratio of alternator speed to engine speed, and the second position provides a second ratio of alternator speed to engine speed. Finally, the apparatus has a mechanism for controlling the driving mechanism. In this way, when the engine runs in the upper range, the driving mechanism is in the first position and the alternator runs at a speed less than the maximum alternator rotary speed and provides electrical energy output greater than the predetermined power level. When the engine runs in the lower range, the driving mechanism is in the second position and the alternator still provides electrical energy output greater than the predetermined power level while running at a speed less than maximum.

The present invention is also directed to a method for using the indicated apparatus. The method includes the steps of running the engine, shifting the driving mechanism from the high ratio to the low ratio to avoid exceeding the maximum speed of the alternator while maintaining the predetermined power level, and then shifting the driving mechanism back from the low ratio to the high ratio when either the load still requires the predetermined power level and the alternator speed needs to be increased to maintain the predetermined power level.

Preferred embodiments are shown in the drawings briefly described hereinafter and are discussed in greater detail with reference to the drawings in the subsection following the drawings.

BRIEF DESCRIPTION OF THE DRAWINGS

FIG. 1 is a side elevational view of apparatus in accordance with the present invention;

FIG. 2 is a perspective view of an alternate embodiment of control mechanism for the variator pulley of the apparatus of FIG. 1;

FIG. 3 is an end view, showing a belt in cross-section, of a variator pulley in accordance with the present invention.

DETAILED DESCRIPTION OF THE PREFERRED EMBODIMENT

Figure 4:
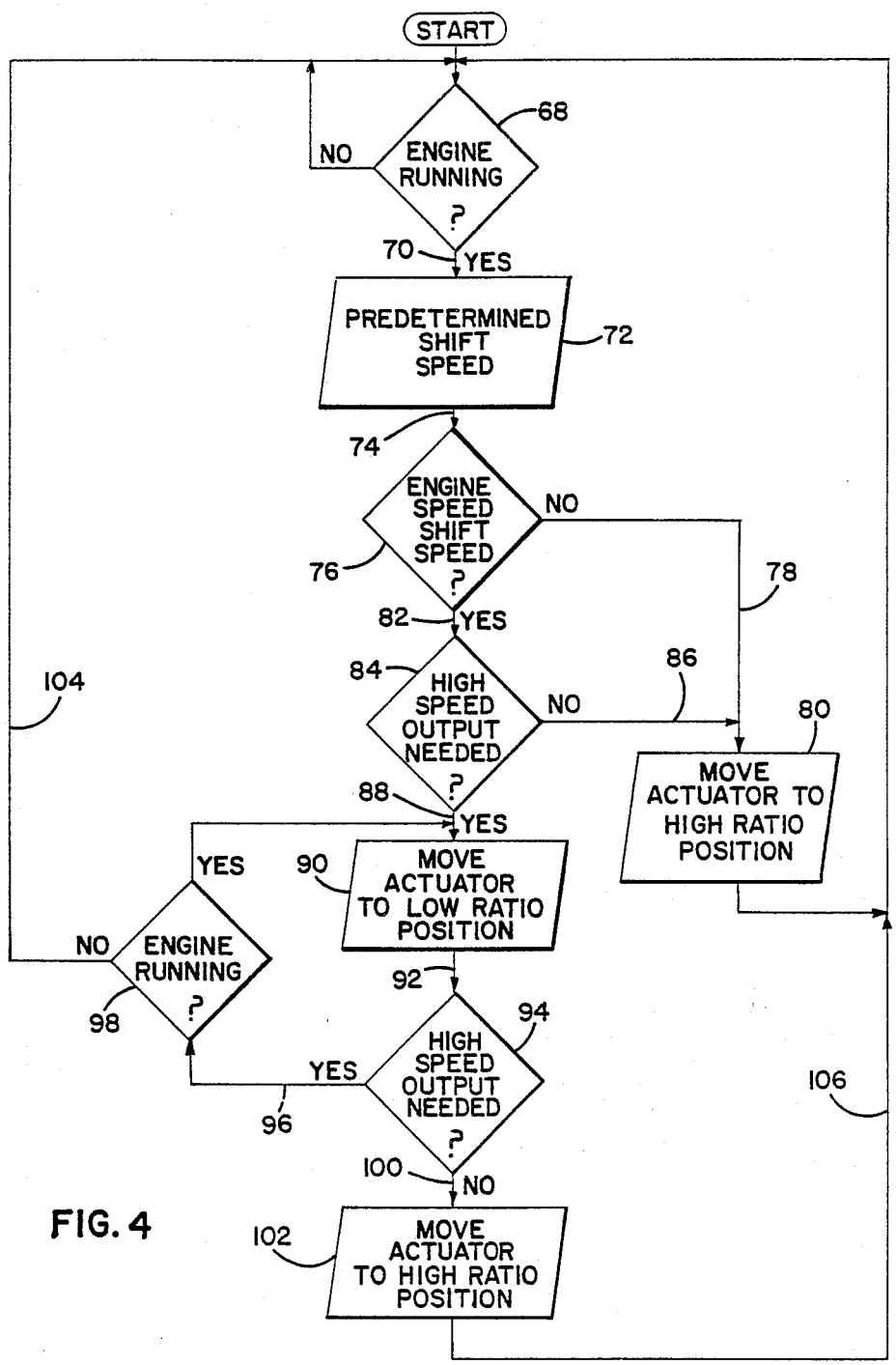
FIG. 4 illustrates a flow diagram of the method of using apparatus in accordance with the present invention.

Referring now to the drawings wherein like reference numerals designate identical or corresponding parts throughout the several views, and more particularly to FIG. 1, apparatus in accordance with the present invention is designated generally by the numeral 10. Apparatus 10 is operably attached to a motor depicted at numeral 12. Motor 12 includes a drive shaft 14 having a main drive pulley 16. Motor 12 also includes an alternator 18 attached to motor 12 at bracket 20. Alternator 18 includes a driven shaft 22 with a driven pulley 24 thereon. Drive and driven shafts 14 and 22 and drive and driven pulleys 16 and 24 are maintained at a generally constant spaced-apart distance. Apparatus 10 functions to operably connect drive and driven pulleys 16 and 24.

Apparatus 10 includes a variator pulley 26 and a mechanism 28 for adjusting variator pulley 26. A typical variator pulley 26 is shown in FIG. 3. Variator pulley 26 includes first and second fixed sheaves 30 and 32. A central movable sheave 34 may slide nearer either of first and second fixed sheaves 30 and 32 along core 36. Variator pulley 26 functions to provide second driven and drive pulleys. In particular, fixed sheave 30 and movable sheave 34 form a second driven pulley. Endless belt 38 extends around drive pulley 16 and the second driven pulley formed by sheaves 30 and 34. In like fashion, fixed sheave 32 and movable sheave 34 provide a second driven pulley. Endless belt 40 extends around driven pulley 24 and the second drive pulley formed by fixed sheave 32 and movable sheave 34. When variator pulley 26 is nearer drive pulley 16, belt 38 is less taut and belt 40 is more taut so that moveable sheave 34 moves nearer driven pulley 24, belt 38 is more taut and belt 40 is less taut so that moveable sheave 34 moves nearer fixed sheave 32.

Mechanism 28 includes a pivotable arm 42 which is movable with a hydraulic or other energized cylinder 44. Arm 42 rotates on a shaft 46 which is part of or otherwise attached to a bracket 48. Bracket 48 is attached to motor 12. At one end of arm 42, there is a second shaft 50 on which variator pulley 26 is mounted. Spacers 52 separate fixed sheave 32 from arm 42. Nut 54 secures variator pulley 26 to shaft 50. At the other end of arm 42, there is a mechanism 56 for pivotally fastening one end of cylinder 44. The other end of cylinder 44 is attached pivotally to a bracket 58. Bracket 58 is attached to motor 12. Cylinder 44 is appropriately controlled as depicted by mechanism 65 in communication with cylinder 44 via lines 67 and 69.

As discussed hereinbefore, use device 59, connected electrically to alternator 18 as illustrated by lines 61 and 63, requires a greater electrical output than alternator 18 can ordinarily provide when engine 12 is idling. Hence, the speed of alternator 18 must be stepped up. Similarly, when engine 12 is operating at a fairly high speed, alternator 18 would run too fast if it were still in the stepped up configuration. Consequently, although it then provides plenty of power for use device 59, it must be stepped down so that it does not overspeed. Mechanism 28 pivots arm 42 to move variator pulley 26 between the first and second stepped down and stepped up positions. In the first position, a first ratio of alternator speed to engine speed is provided such that the alternator runs at a speed less than the maximum alternator rotary speed and still provides electrical energy output greater than that required for the use device. In the second position, a second ratio of alternator speed to engine speed is provided wherein alternator speed is stepped up so as to provide electrical energy output greater than a minimum power level required by the use device.

An alternate embodiment mechanism 28' for moving variator pulley 26 between first and second positions is shown in FIG. 2. Mechanism 28' includes a body 60 for attachment to motor 12. Body 60 has a dovetail slot 62 running from one end to another. A slide 64 fits in slot 62 for movement therein. A shaft 66 is attached to slide 64 and provides a function similar to shaft 50. A cylinder 44' moves slide 64 from one position to another thereby moving variator pulley 26, when it is installed on shaft 66, between first and second positions as described hereinbefore.

The method of use of apparatus 10 is illustrated in FIG. 4. As indicated by diamond box 68, the engine must be running. If the engine is running, line 70 leads to box 72 indicating that the system must know a predetermined speed or other parameter at which shifting of the variator pulley from the first position to the second position or vice versa takes place. Then, as indicated by line 74 leading to diamond box 76, the predetermined shift speed is compared with actual engine speed to determine if the predetermined shift speed has been exceeded. If it has not, as line 78 leading to box 80 indicates, the actuator mechanism keeps the variator pulley in the high ratio position. If the shift speed has been exceeded, then as indicated by line 82 leading to diamond box 84, the system determines whether the use device requires high speed output. If it does not, then as indicated by line 86, again the actuator mechanism keeps the variator pulley in position to maintain the low high ratio. If the high speed output is required, as indicated by line 88 leading to box 90, the actuator mechanism moves the variator pulley to achieve the high speed low ratio position. The low ratio position is maintained as indicated by line 92 leading to diamond box 94, as long as high speed output is needed and as indicated by line 96 leading to diamond box 98, as long as the engine is running. If the high speed output is not needed, as indicated by line 100 leading to box 102, the actuator mechanism moves the variator pulley so that the system achieves the low high ratio. Whenever the engine is turned off as indicated by line 104 or whenever the actuator mechanism is moved to achieve the high ratio position as indicated by line 106, the logic process repeats.

In an exemplary application of the present invention, an alternator provides an electrical energy power level necessary to regenerate an exhaust filter for a diesel engine. In this situation, the objective is to keep the alternator at maximum speed below 10,000 rpm at a 3,000 rpm engine high idle condition. During filter regeneration, a further objective is to maintain a minimum alternator speed of 4,000 rpm at 700 rpm engine idle. The following tables of rpm's and pulley ratios are illustrative:

TABLE 1

| NORMAL ENGINE OPERATION | | | | |
|---|---|---|---|---|
| Condition | Engine RPM | Variator RPM | Alt. Rpm | Ratio |
| Idle | 700 | 1680 | 2300 | 3.3 |
| Rated RPM | 2600 | 6240 | 8580 | 3.3 |
| HI Idle | 3000 | 7200 | 9900 | 3.3 |

TABLE 2

| PERIODIC REGENERATION OPERATION | | | | |
|---|---|---|---|---|
| Condition | Engine RPM | Variator RPM | Alt. Rpm | Ratio |
| Idle | 700 | 2700 | 4000 | 5.7 |
| Variator Shift Down | 1225 | 4725 | 7000 | 5.7 |
| Variator Shift Up | 1226 | 2940 | 4040 | 3.3 |
| Rated RPM | 2600 | 6240 | 8580 | 3.3 |
| HI Idle | 3000 | 7200 | 9900 | 3.3 |

About 90% of the duty cycle would be between 1225 rpm and 2600 rpm of the engine or between variator pulley speeds of approximately 2940 rpm to 6240 rpm. The electrical power load required would be for normal battery charging. For a 12 to 14 volt battery having 125 amp maximum capacity, it is estimated that generally less than 30 amps power load would be required.

When the diesel filter required regeneration, the load would increase to approximately 2.7 kw. If engine speed dropped below 1225 rpm, the inventive apparatus would be actuated so that the variator pulley moved to the hi ratio 5.7.

It is noted that the numbers in the table are approximate, but that various parameters can be adjusted as needed to achieve the concept illustrated.

Thus, the present invention has been illustrated and described, and an example of its application presented. It is understood, however, that equivalents are possible. Consequently, any changes made from the disclosure as presented, especially in manners of shape, size and arrangement of parts, to the full extent extended by the general meaning of the terms in which the appended claims are expressed, are within the principle of the invention.

What is claimed is:

1. Apparatus for converting mechanical energy to electrical energy to power a use device, comprising:
    means for driving a drive shaft, said driving means including a first drive pulley attached to said drive shaft;
    an alternator having a driven shaft and a first driven pulley attached thereto;
    means for holding said alternator relative to said driving means so that said drive shaft and said driven shaft are maintained at a generally constant spaced-apart distance;
    means for supporting an idling shaft, said supporting means including a first structural assembly which is generally fixed relative to said drive shaft and said driven shaft, said supporting means further including a second structural assembly with said idling shaft rotatably attached thereto, said supporting means also including means for moving said second structural assembly so that said idling shaft selectively moves between first and second positions, said first position being nearer to said driven shaft and farther from said drive shaft, said second position being nearer to said drive shaft and farther from said driven shaft;
    a compound pulley having fixed first and second outer sheaves and a moveable center sheave, said compound pulley being mounted on said idling shaft, said compound pulley forming a second driven pulley on one side of said center sheave and a second drive pulley on the other side of said center sheave;
    first and second inextensible belts, said first belt being entrained about said first drive pulley and said second driven pulley, said second belt being entrained about said second drive pulley and said first driven pulley; and
    means for controlling said moving means;
    whereby movement of said idling shaft to one of said first and second positions reduces the speed ratio of said first driven pulley relative to said first drive pulley while movement of said idling shaft to the other position increases the speed ratio.

2. Apparatus for powering an electrical load at or greater than a predetermined power level, comprising:
    an engine having a continuous speed range including an upper speed portion and a lower speed portion, said engine also having an output drive member;
    an alternator which increases electrical energy output as rotary speed increases to a maximum speed, the electrical energy output being less than the predetermined power level for the lower speed portion of said engine speed range and greater than the predetermined power level for the upper speed portion;
    means for electrically connecting said alternator and said load;
    means for driving said alternator with said output drive member, said driving means including first and second positions, said first position providing a first ratio of alternator speed to engine speed and said second position providing a second ratio of alternator speed to engine speed; and
    means for controlling said driving means;
    wherein when said engine runs in said upper speed range, said driving means is in said first position and said alternator runs at a speed less than said maximum alternator rotary speed and provides electrical energy output greater than the predetermined power level and wherein when said engine runs in said lower speed range, said driving means is in said second position and said alternator provides electrical energy output greater than the predetermined power level.

3. A method for using an engine operating at various speeds to power an electrical load which selectively requires a predetermined power level, said engine driving with driving means, an alternator which is electrically connected to said load, said alternator increasing electrical energy output as rotary speed increases to a maximum speed, said driving means having a low ratio of alternator speed to engine speed and a high ratio of alternator speed to engine speed, both said low and high ratios providing said predetermined power level such that said alternator does not exceed said maximum speed, said method comprising the steps of:
    running said engine;
    shifting said driving means from said high ratio to said low ratio to avoid exceeding said maximum speed of said alternator while yet maintaining said predetermined power level; and
    shifting said driving means back from said low ratio to said high ratio when one of said load no longer needs the predetermined power level and said alternator would otherwise run too slowly to provide said predetermined power level.

4. The method in accordance with claim 3 wherein said driving means includes control means and wherein before said first shifting step said method includes comparing with said control means the speed of the engine to a predetermined shaft speed and determining whether said load requires the predetermined power level.

5. The method in accordance with claim 4 wherein before said second shifting step said method includes determining whether said load requires the predetermined power level.

* * * * *